Jan. 26, 1965 L. M. TOMS 3,167,074

FILING DEVICE

Filed Aug. 25, 1961 4 Sheets-Sheet 1

INVENTOR.
LLOYD M. TOMS
BY
Gary, Desmond & Parker
ATTYS.

FILING DEVICE

Filed Aug. 25, 1961

INVENTOR.
LLOYD M. TOMS
BY
Gary, Desmond & Parker
ATTYS.

FILING DEVICE

Filed Aug. 25, 1961 4 Sheets-Sheet 3

INVENTOR.
LLOYD M. TOMS
BY
Gary, Desmond & Parker
ATTYS.

Jan. 26, 1965 L. M. TOMS 3,167,074

FILING DEVICE

Filed Aug. 25, 1961 4 Sheets-Sheet 4

INVENTOR.
LLOYD M. TOMS
BY
Gary, Desmond & Parker
ATTYS.

3,167,074
FILING DEVICE
Lloyd M. Toms, Crozet, Va., assignor to Acme Visible Records, Inc., Crozet, Va., a corporation of Delaware
Filed Aug. 25, 1961, Ser. No. 133,929
2 Claims. (Cl. 129—16)

This invention relates to improvements in visible record filing devices of the class wherein a plurality of loose leaf record cards provided with notches opening to their lower edges are engaged over spaced bars extending longitudinally of the cabinet base so as to permit the cards, which are of lesser width than the cabinet, to be filed in position in a series with side edges overlapping. These laterally offset card echelons are further spaced from adjacent card echelons by separators on index tabbed dividers, said cards and dividers therefor being further separated in groups by a plurality of main dividers pivotally mounted within the cabinet in a manner whereby the said cards and dividers can be angularly spaced for access.

Heretofore, record cards and sub or intermediate dividers therefor were disposed between a pair of main dividers in a space defined by relatively thick end rails for the main dividers as in Hall et al. U.S. Patent No. 2,435,077, or by foot portions of a width or diameter relatively large as to the thickness of the dividers as in Hall U.S. Patent No. 2,550,117, so as to similarly define a relatively fixed space between adjacent main dividers.

In such prior constructions, the main dividers were supported on their side rails in a pivotal manner by a side rail leg portion either resting on the base of the cabinet or within retainers extending longitudinally of the cabinet. In any event, the dividers were freely slidable longitudinally of the cabinet so that in order to maintain an operative assembly, it was required that the cabinet or receptacle to be filled with main dividers in abutting relationship, either at their side rails or pivot terminals at the bottom of the side rails. This free disposition or retention of the side rails or supporting legs for the main divider panels further limited the number of cards and intermediate dividers that could be disposed between a pair of adjacent main dividers.

Again, in such prior practice, if the amount of record cards and intermediate dividers was of a thickness such that adjacent main dividers became spaced a greater than the normal distance between the dividers as aforesaid, when the contents between them was removed the space would immediately close up to the limits of the side rails or their pivotal foot portions tending to disturb and misalign the relationship of the cards and remaining subdividers, to bring about improper binding, displacement of the cards in their echelons, and the like.

It is therefore an object of the present invention to provide a novel construction and arrangement in a record filing device of the aforesaid class wherein spacing between the main dividers is not dependent upon the thickness of their supporting end rails or any component portion thereof, but rather one wherein said dividers may be individually engaged or removed from the cabinet and disposed therein and pivotally retained in selectively spaced relationship to each other.

A further object of the present invention is to provide novel means or leg portions on the main dividers for pivotal engagement with means on the record card receptacle base which prevents lateral movement of the divider but permits it to be selectively retained in pivotal engagement whereby an adjacent pair of main dividers and their interposed contents may be freely pivoted to give access to interposed records, and wherein the spacing between the adjacent dividers may be varied to suit the desired thickness of interposed material, and such position retained until positively changed at the will of the user.

Another object of the present invention is to provide means for spacing dividers where the spacing is infinitely adjustable to allow the divider spacing to be fitted to the records rather than the records having to be fitted to the fixed characteristics of the divider. This results in maximum utilization of available filing space or size of receptacle.

Further objects of the present invention relate to details of construction and arrangement of parts of the foregoing, as well as other details, as will be apparent from a consideration of the following specification and accompanying drawings, wherein.

Figures 1, 2:
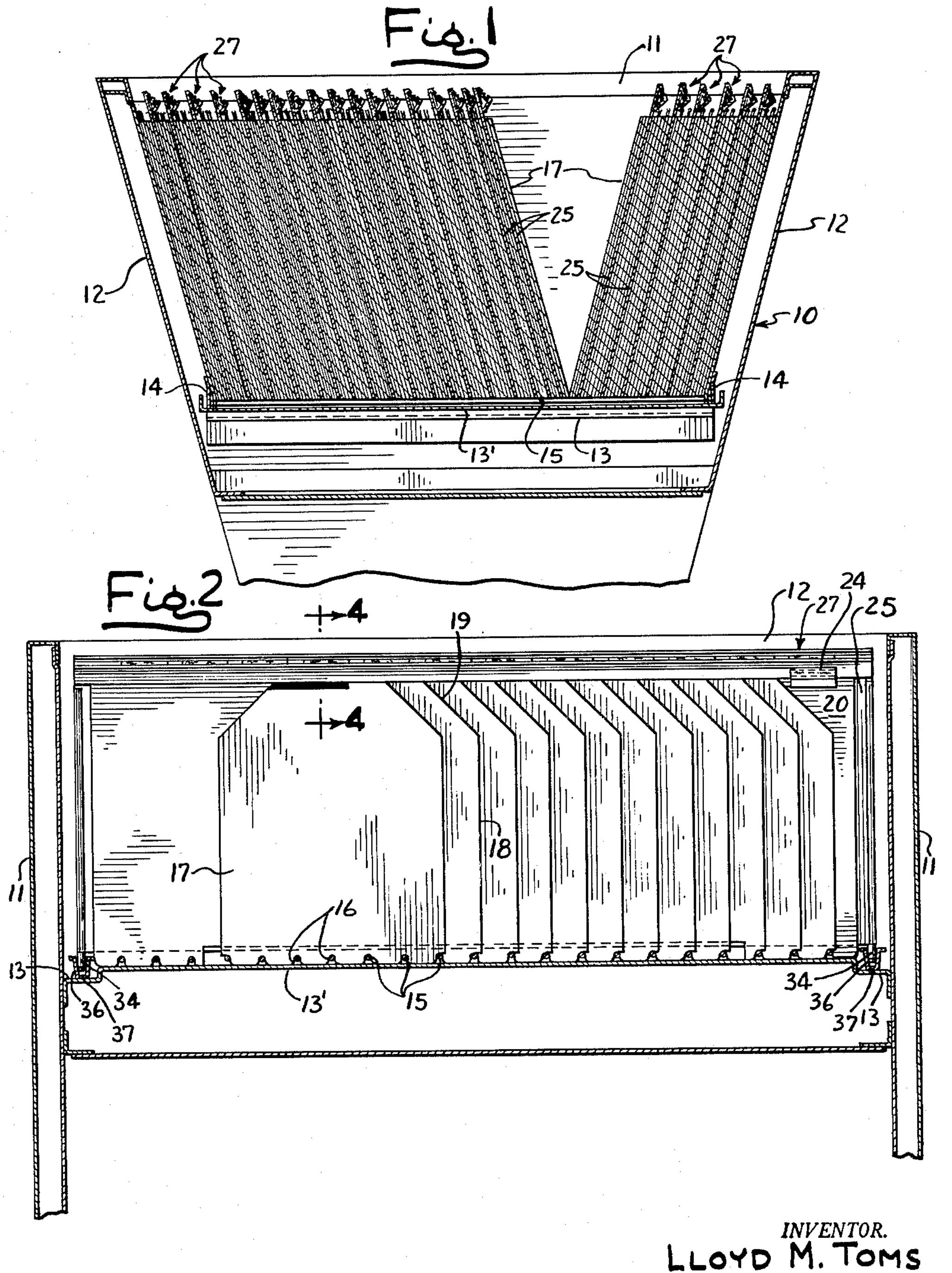
FIG. 1 is a longitudinal section of the record filing device in accordance with the present invention.
FIG. 2 is a transverse sectional view thereof.

Referring to the drawings, the reference numeral 10 generally indicates a receptacle or cabinet for supporting record cards comprising a pair of side walls 11, 11 which extend vertically and parallel to each other, and a pair of inclined front and rear walls which diverge upwardly and outwardly from the base generally indicated as 13. Supported between the members 14, 14 adjacent the inclined ends 12, 12 and on the base 13 are a plurality of regularly spaced rods or bars 15 extending longitudinally of the cabinet, that is, in a direction between the inclined ends 12, 12 and laterally spaced from each other in the regular manner between and parallel to the sides 11, 11.

These bars or rods 15 are adapted to project into the notches or holes 16 formed in and opening to the bottom edge of the record cards 17 whereby a plurality of these record cards, which are of less width than the cabinet 10, can be disposed therein, as is conventional, in laterally offset echelons whereby the marginal edge portions of the indexed side edges of the card, as at 18, and the upper inclined edges thereof, as at 19, may be readily determined by exposing them upon angularly spacing an intermediate divider generally indicated as 20, or the main divider generally indicated as 21, out of contiguous relationship with a group or echelon of cards 17.

Figures 7, 9, 10, 11:
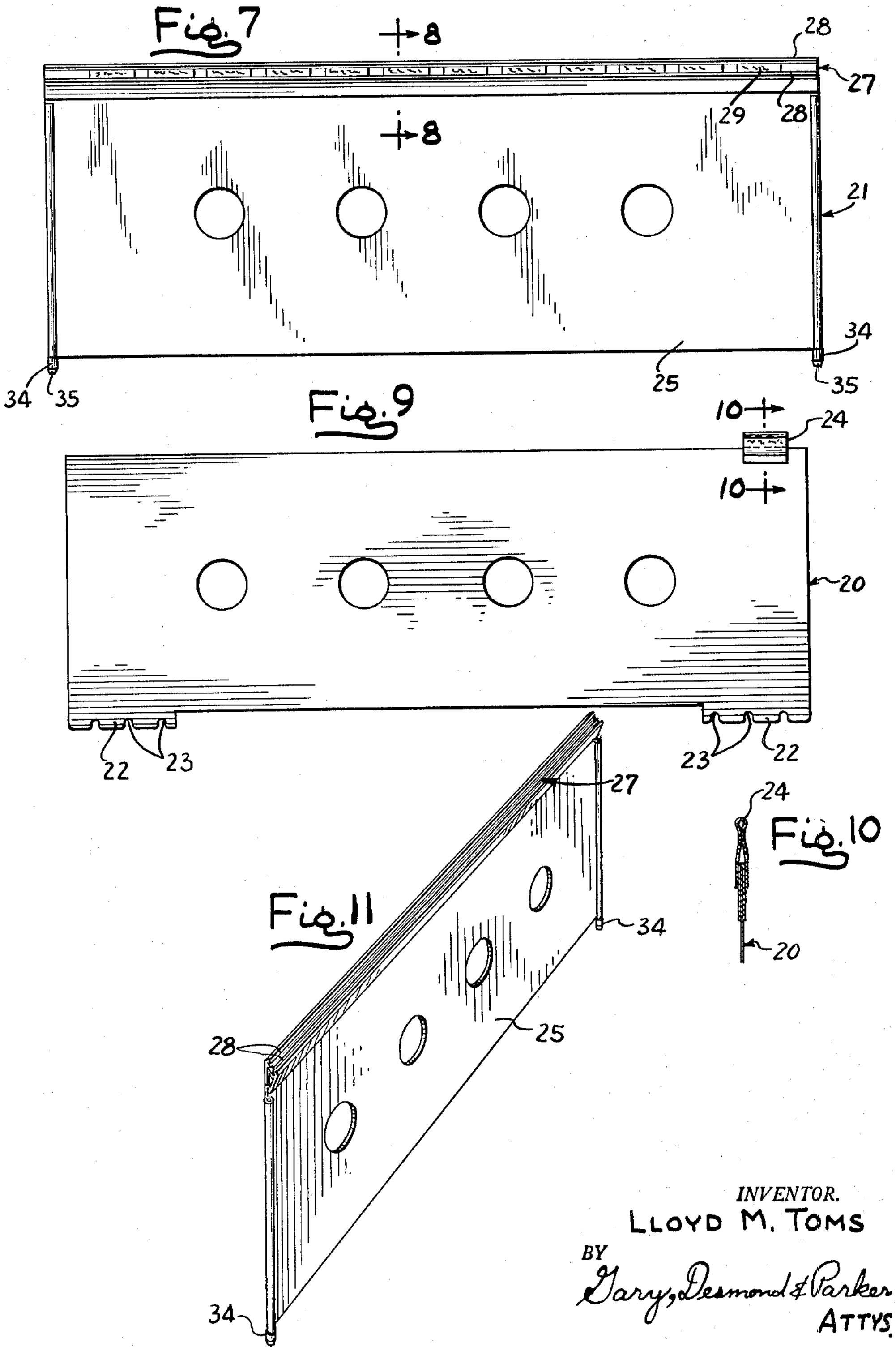
FIG. 7 is a front elevational view of the main divider panel of the present invention.
FIG. 9 is a front elevational view of a sub or intermediate divider.
FIG. 10 is a fragmentary enlarged sectional view taken on line 10—10 of FIG. 9.
FIG. 11 is a perspective view of the main divider of FIG. 7.

As appears from FIG. 9, the intermediate dividers 20 may be comprised of relatively thin sheet material such as paperboard, and these dividers are relatively elongated so that they extend substantially the width of the cabinet between the sides 11, 11 thereof. The intermediate dividers 20 are further provided with a pair of foot portions 22, 22, each provided with a series of notches 23 for seating engagement over the rods 15 on the base of the cabinet 10. These sub-dividers 20 are also conventionally provided with an individual index tab 24 which may be of transparent plastic sheet material adapted to removably receive an indicia strip. Although FIG. 9 shows the index tab 24 engaged adjacent one upper corner, it will be understood that when a plurality of intermediate dividers 20 are disposed between a pair of main dividers 21, the tabs 24 on adjacent intermediate dividers 20 are staggered or laterally offset.

The main divider 21 of the present invention comprises an elongated panel 25 which is suitably composed of sheet plastic, fiberboard or metal, the length of the panel 25 being substantially that of an intermediate divider 20. In the case of the main divider 21, the side edges of the sheet metal panel 25 are vertically reinforced by being rolled to form barrels or tubes 26, it being desirable to reinforce the panels 25 since they are generally the ones that are handled and pivoted while supporting an appreciable number of record cards 17 and subdividers 20. Extending from and secured to the upper marginal edge portion of the panels 25 and beyond the upper terminals of end reinforcing barrels or tubes 26 is a channel member generally indicated as 27 comprising a pair of forwardly projecting flanges 28, 28 adapted for slidable reception of index strips 29 correlated to the indicia contained in the index tabs 24 on the subdividers 20. As appears in FIG. 7, the channel member 27 is provided with a pluralty of index tabs 29 laterally spaced therein which index tabs may be suitably correlated to and spaced in a manner similar to that of the spacing of index tabs 24 on a group of adjacent intermediate dividers 20 disposed rearwardly or forwardly of an adjacent main divider.

Figures 12, 13:
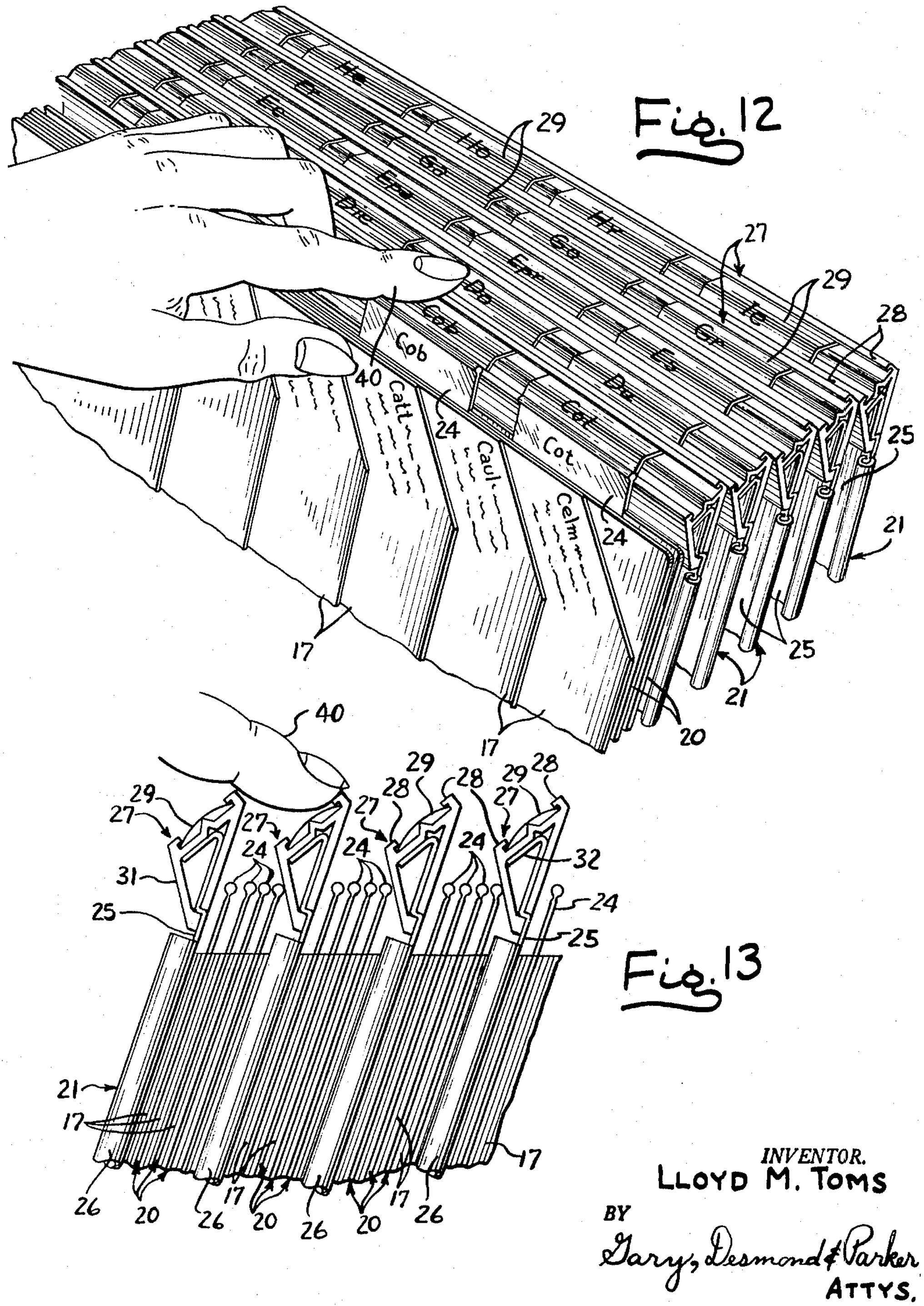
FIG. 12 is a fragmentary top perspective view of a filing device assembly of the present invention showing one method of arrangement and use thereof.
FIG. 13 is a fragmentary transverse sectional detail of the assembly of FIG. 12.

FIGS. 12 and 13 illustrate index tabs 29 mounted in the channel member 27 of the main dividers 21 correlated to and spaced in a manner similar to that of the spacing of the index tabs 24 on intermediate dividers 20 disposed forwardly of an adjacent main divider 21. In operation, the operator places his finger 40 on the alphabetical index tab 29 to which he wishes to refer and by a downward and forward motion the finger 40 encounters the corresponding forwardly disposed tab 24 and thereby automatically brings forward its associated intermediate divider 20.

This method of rearward indexing of a main divider with respect to tabs 24 of intermediate dividers 20 disposed in front of it is preferable to forward indexing wherein the index tabs 24 of the intermediate dividers 20 are disposed and correlated rearwardly of the index tabs 29 of a main divider 21, since it is a natural action to place one's finger on what one is looking for and then pull forward, thereby automatically locating the desired index. Further, the surface of the index tab 29 in an inclined channel 27 tends to make the finger slide downward when pulling forward. With this arrangement and mode of use, the main divider remains in place, continuing to expose the intermediate divider indexing for every bank of cards 17 in the group not already pulled forward, as well as for those banks already brought forward.

Another advantage of rearward indexing of a main divider in correlation to the tabs 24 of intermediate dividers disposed in front of it, as shown in FIG. 13, is that there need not be any indicia on or in the tabs 24; that is to say, the tabs 24 may be "blind" and serve only as hand hold or pull tabs, since the main divider with its indicia remains as a visible index for any remaining "blind" tabs 24. This is to be distinguished from the opposite arrangement, herein also described, where the main divider is indexed in relation to rearwardly disposed intermediate dividers. With such arrangement it is essential that index tabs 24 carry indicia since once a main divider, with one or more subdviders is pivoted forwardly, the remaning indicia on the main divider tab no longer is useful in connection with any of the subdividers that remain of the original group between a pair of main dividers.

Figures 3, 4, 5, 6, 8:
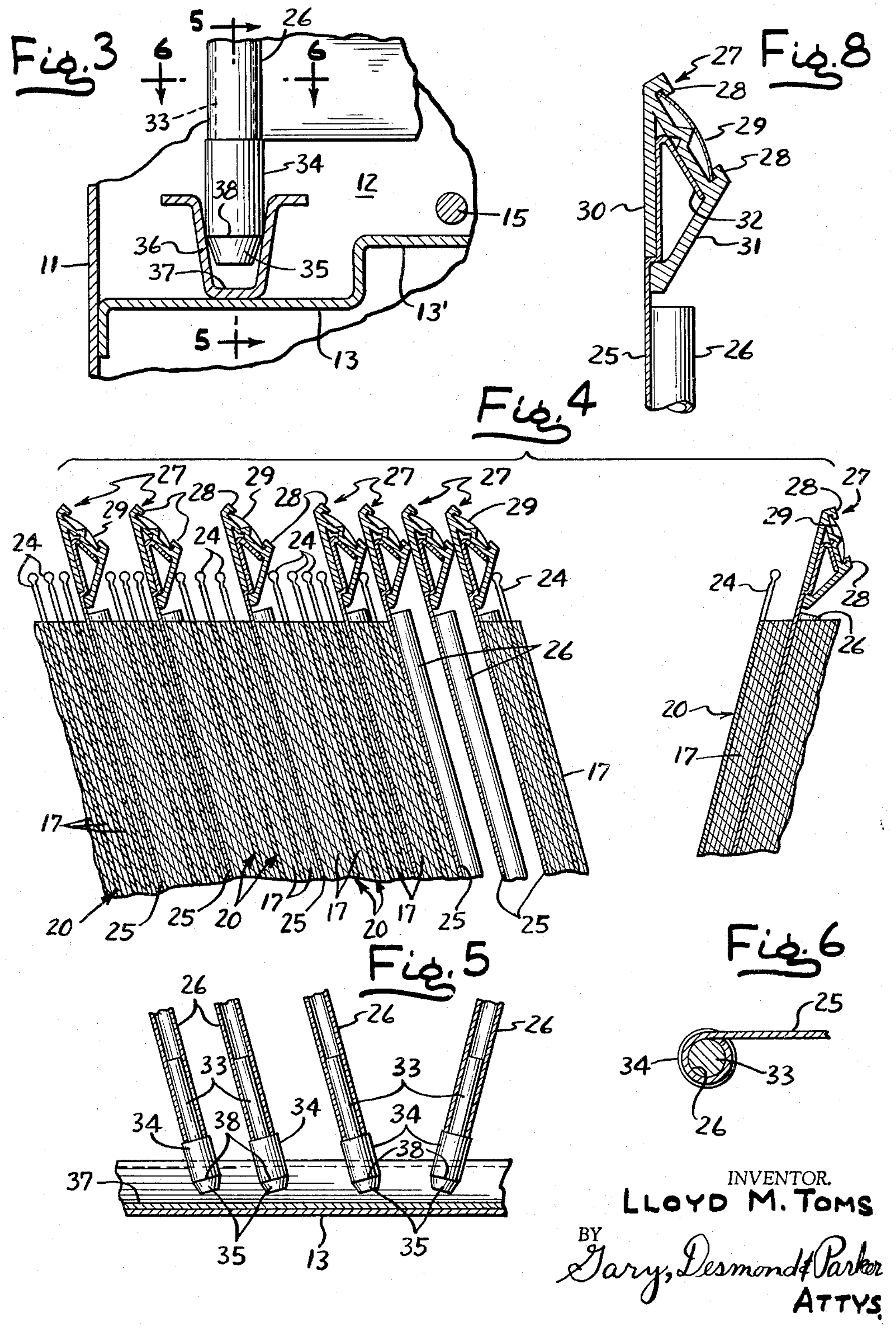
FIG. 3 is a relatively enlarged detailed sectional view of one corner of a main divider panel pivotally engaged within a channel member extending longitudinally of the base of the supporting receptacle of the present invention.
FIG. 4 is a fragmentary relatively enlarged view of the assembly shown in FIG. 1, taken on the line 4—4 of FIG. 2.
FIG. 5 is a fragmentary detailed view of a section taken along line 5—5 of FIG. 3.
FIG. 6 is a fragmentary detailed sectional view taken on the line 6—6 of FIG. 3.
FIG. 8 is a fragmentary relatively enlarged sectional view taken on the line 8—8 of FIG. 7.

The channel member 27 can be composed of extruded metal such as aluminum, or plastic, and formed with a rearward extension 30 and a front bracket or leg 31 forming a pocket which receives the inclined return-bent extension 32 at the upper edge of panel 25 in locking engagement, as best shown in the detail of FIG. 8. This channel 27 serves to provide longitudinal reinforcement for the panel 25 in addition to its indexing function.

Although not shown, as non-fully equivalent alternatives the channel member 27 and the associated panel extension 32 may be constructed and arranged in conventional manner so that the index tabs 29 are either supported substantially parallel to, or inclined rearwardly from, the plane of panel 25.

Further, although not shown, in lieu of the continuous elongated index channel member 27, I may employ one or more relatively shorter index tabs adapted to slidably receive indicia inserts. These likewise may be inclined or straight and removably engaged, as by clamps, or fixedly secured as shown, or by rivets, to the upper edge of panel 25.

The side reinforcements 26 terminate adjacent the bottom edge of the panel 25, leaving a tubular portion which receives the shank 33 of shouldered pin 34. This pin 34 is formed with a truncated, conical terminal end portion 35 as best shown in FIGS. 3 and 5, and projects within a channel member of substantially V-shaped cross-section comprising a pair of upwardly diverging sides 36, 36 and a base portion 37. The latter is secured to the base 13 of the cabinet 10 in a direction parallel to the sides 11 and adjacent said sides. This channel member is suitably composed of resilient material such as steel and receives the circular edge 38 of pin 34 in resilient frictional pressed engagement so that the main divider panel is held against lateral displacement and also against accidental or free displacement longitudinally of the channel.

Pressing down on the main divider wedges its pins 34 in the resilient channels so that the main divider is retained in pivotal engagement at diametrically opposed points of the base of the conical tip 35 on the circle 38. The angle of inclination or taper of the end portion 35 of pin 34 is greater than that of side walls 36, 36 so that the taper of end 35 in no way limits the frictional engagement of pin 34 in the channel.

Although a cylindrical pin 34 and a truncated conical tip 35 are shown, it will be understood that frictional pivoting engagement may also be accomplished, although not in a fully equivalent manner, by employing a spherical tip, not shown, at the end of pin 34 of greater diameter than that of pin 34.

Since pivoting is substantially on the edge 38 or the equivalent, the tapered portion 35 serves essentially as an entrance aid or guide to the resilient channels.

In order to prevent the tendency by a main divider 21 to move and lift cards 17 and intermediate dividers 20 when a main divider is operatively pivoted, it is preferred that the circle 38 defining the base of the tapered tip 35 be on the same plane as that of the card pivot plane, in this case the upwardly offset bottom or platform portion 13, when the tip 35 is normal thereto, as shown in FIG. 3.

With the foregoing arrangement the main divider and panels 25 may be variably spaced from each other by wedging their pins 34 at any point along the channels, thus providing entrance spacing between said dividers for any number of intermediate dividers 20 and record cards 17 between an adjacent pair of main divider panels 25, as appears from FIG. 4. Although FIG. 1 contains an equal number of intermediate dividers between the main divider panels, this should be considered diagrammatic for the purpose of illustration, since in use such even arrangement does not and need not occur in the use of the device of the present invention.

It will also be apparent, particularly from the illustrations of FIGS. 4 and 5, that the desired space between divider panels 25 remain fixed until the entire divider is lifted out and re-engaged at another point. Thus, when cards or sheets 17 are temporarily removed between the main divider panels 25, the spacing remains as pre-set so that the sheets can be replaced in proper position with ease, thereby facilitating rapid posting or handling.

Although the preferred form of the invention has been shown and described herein, it will be understood as in part indicated hereinbefore that changes may be made in the details thereof without departing from the spirit of the invention as comprehended by the following claims.

It is claimed:

1. In a record filing device, a receptacle including a supporting base, a record divider comprising a panel and a pair of spaced parallel rigid cylindrical supporting pins projecting downwardly from the bottom edge thereof terminating in tapered end portions, and a pair of spaced parallel resilient upwardly opening channel members secured to said base and disposed transversely of said divider, the defining sides of said channel members being planar and diverging upwardly and outwardly and frictionally receiving said pins in yieldable wedged engagement at a selected position longitudinally of the channels and pivotally retaining them substantially at the widest opposed points of said taper.

2. The record filing device of claim 1 including a plurality of said record dividers disposed in selectively spaced relationship to each other longitudinally of said channels.

References Cited by the Examiner

UNITED STATES PATENTS

| | | | |
|---|---|---|---|
| 2,042,167 | 5/36 | Beeler | 129—16 |
| 2,582,729 | 1/52 | Wassell | 129—16 X |
| 2,634,729 | 4/53 | Weston | 129—16 |

FOREIGN PATENTS

| | | |
|---|---|---|
| 499,437 | 12/50 | Belgium |
| 1,129,238 | 9/56 | France |
| 692,774 | 6/40 | Germany |
| 217,105 | 6/24 | Great Britain |
| 656,884 | 9/51 | Great Britain |

JEROME SCHNALL, *Primary Examiner.*